Sept. 24, 1946.  J. F. SCHILLER  2,408,000
VALVE
Filed March 23, 1944
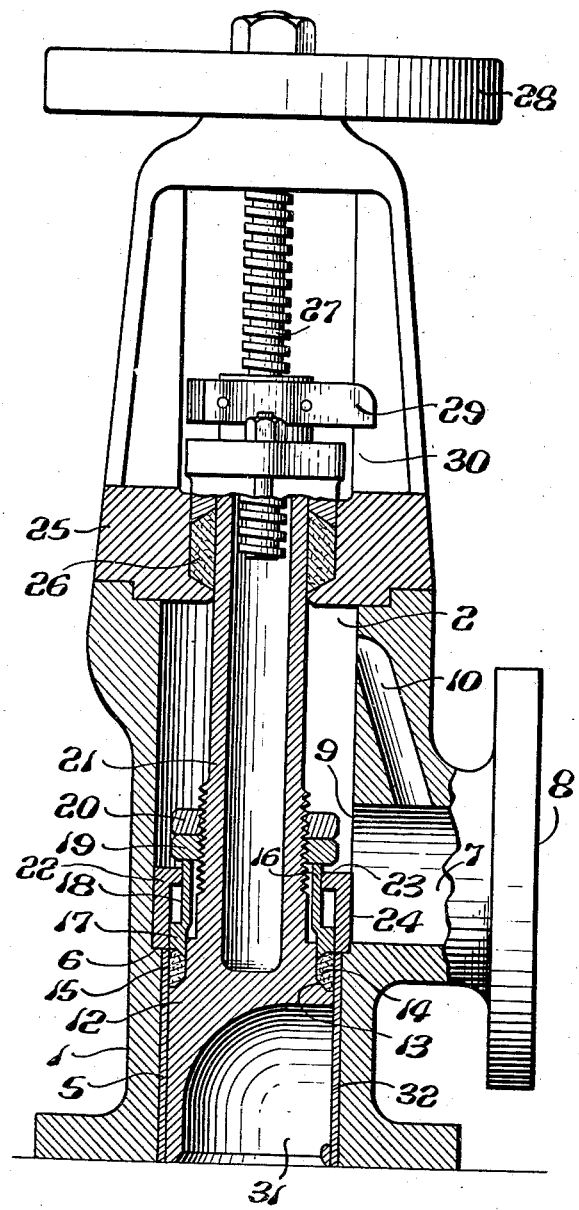
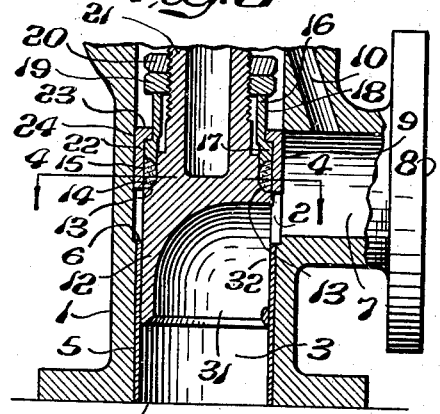
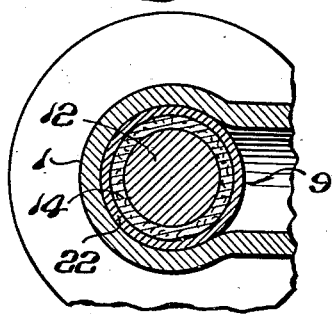
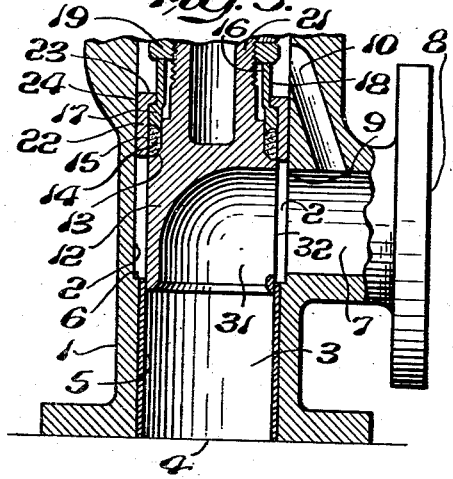
INVENTOR.
JOSEPH F. SCHILLER
BY
ATTY.

Patented Sept. 24, 1946

2,408,000

UNITED STATES PATENT OFFICE 2,408,000

VALVE

Joseph F. Schiller, Drexel Hill, Pa., assignor to Schade Valve Manufacturing Company, Philadelphia, Pa., a corporation of Pennsylvania Application March 23, 1944, Serial No. 527,778

9 Claims. (Cl. 277—29)

My invention relates to improvements in valves, and particularly in valves of the general type shown in my Letters Patent of the United States Nos. 1,044,259 and 1,166,638.

The leading object of my invention is the protection of the valve packing from deleterious action of abrasive or corrosive material entrained with fluid flowing through or controlled by the valve, and particularly to provide such protection for packing which is expansible by the pressure of the fluid so that the valve is tightened by such pressure and proportionately thereto and may be manually expanded to provide a minimum tightness in the joint between the packing and the complementary surface engaged thereby.

In the preferred embodiment of my invention, an annular shield is slidably mounted on a valve piston carrying a packing. The shield is movable by and on the piston so as to cover the peripheral or seal-forming surface of the packing when the valve is in open position and permit egress of the packing into seal-forming engagement with a complementary body surface on the movement of the valve toward closed position; the shield being interposed between the packing and an inlet port in the closed position of the valve.

My improvements are particularly advantageous for incorporation in boiler blow-off valves of the piston type in which pressure is admitted to opposite surfaces of the piston to facilitate the manipulation thereof and in which the pressure acts to expand the packing against a complementary body surface in the closed position and against the shield in the open position.

The characteristic features and advantages of my improvements will further appear from the following description and the accompanying drawing in illustration thereof.

In the drawing, Fig. 1 is a vertical sectional view of a valve embodying my invention with the valve piston in the closed position; Fig. 2 is a fragmentary vertical sectional view of the valve shown in Fig. 1 with the valve piston partly open and the packing thereof protected in accordance with my invention; Fig. 3 is a fragmentary vertical sectional view of the valve shown in Fig. 1 with the valve piston in the fully opened position; and Fig. 4 is a fragmentary transverse sectional view taken on the line 4—4 of Fig. 2.

In the embodiment of my invention illustrated in the drawing, a valve body 1 is counterbored to form a longitudinal passage having an upper section 2 of larger diameter and a lower section 3 of smaller diameter and terminating in a discharge port 4. The section 3 is preferably lined with a tightly fitting non-corrosive liner 5, the top of which registers with a shoulder 6 between the walls of the sections 2 and 3 to form a step or rest.

A transverse bore 7, having an inlet port 8, communicates with the bore section 2 through the port 9 adjacent to the shoulder 6 and also through the by-pass 10 which discharges to the bore section 2 near the upper end thereof.

A valve piston or closure is reciprocable in the bore sections 2 and 3 and comprises a head 12 containing a peripheral groove 13 for a packing ring 14 which has a peripheral surface 15 for engagement with the complementary inner surface of the liner 5 to form a fluid-tight or sealing joint when the closure is moved downward as shown in Fig. 1.

A gland 16, comprising a ring follower 17 and a collar 18 of smaller diameter than the ring, is sleeved on the valve piston and pressed against the packing 14 by the pressure of fluid entering the passage 2 through the port 9 or through the by-pass 10. The gland may be manually adjusted, to exert a minimum pressure on the packing, by means of the nuts 19 and 20 threaded on the stem 21 of the valve piston.

A shield 22 makes a sliding fit with the interior surface of the bore section 2 and has a collar 23 sleeved on and making a slip fit with the collar 18 between the ring 17 and nut 19, and a depending cylindrical skirt 24 which is slidable over the peripheral surfaces of the ring 17 and packing 14, the shield being forced downward by the fluid pressure until checked by the engagement of the collar 23 with the upper surface of the follower 17 or by the engagement of the skirt 24 with the shoulder 6.

The top of the passage section 2 is closed by the base of a yoke 25 bolted to the body 1 and containing a packed bearing 26 through which the stem 21 is reciprocable. The upper portion of the stem 21 is internally threaded for engagement by a screw 27 journalled in the yoke 25 and rotatable by a handwheel 28. A bifurcated dog 29 is fixed to the stem 21 and is movable along a slideway 30 formed by an arm of the yoke to prevent rotation of the stem 21.

The valve head 12 preferably extends well beyond the groove 13 and contains a curved passage 31 having a port 32 movable into registration with the port 9 and an outlet discharging into the passage 3.

It will be understood that when the valve is in the fully open position (Fig. 3), the shield 22 occupies its lowermost position with its skirt 24 completely covering the sealing-forming face 15 of the packing 14. The shield is held in its lowermost position by pressure transmitted through the by-pass 10 and such pressure also expands the packing against the shield.

During the descent of the piston head 12 (Fig. 2) the shield retains its protective position until the bottom of the skirt 24 engages the step 6, after which the packing 14 moves downward through the shield into engagement with the complementary surface of the liner 5 and is expanded against such surface by fluid pressure acting on the gland 18.

On opening the valve, the packing 14 on the head 12 rises within the shield 22 until the ring 17 engages the collar 23 to lift the shield from the seat 6 and carry it upward with the piston. All the movements of the shield, as well as of the piston, are accomplished by the turning of the hand wheel 28, which is easily manipulated due to the balanced condition of the piston.

Having described my invention, I claim:

1. A valve comprising complementary body and closure members having complementary engaging sealing surfaces, and a shield for one of said sealing surfaces and movable relatively thereto for engagement of said sealing surfaces, and a seat for supporting said shield when said sealing surfaces are in engagement with one another, said closure member having an apertured portion shielding said seat when said sealing surfaces are disengaged from one another.

2. A valve comprising complementary body and closure members having complementary engaging sealing surfaces, one of said sealing surfaces being expansible and a ring encircling and shielding the sealing surface of the closure when disengaged from the complementary sealing surface of the body, and a gland operable by fluid pressure for expanding said expansible surface.

3. A valve comprising a body member containing an axial bore and a transverse bore each having a wall, a closure member having a sealing surface for engaging said wall of the axial bore and reciprocable in said bore across the transverse bore toward open and closing positions, and a shield for the sealing surface of said closure member, said shield being positioned above the top of the transverse bore in the open position of the valve and below the top of the transverse port in the open position of said valve, said closure member being movable relatively to said body and to said shield into engagement with the wall of said bore, and pressure of fluid from said transverse bore acting solely in a closing direction upon the closure member when the valve is closed.

4. A valve comprising a body containing a bore having sections of different diameters with a shoulder between them, a closure reciprocable to open and closed positions in said bore and having a packing movable into and out of engagement with the wall of one of said sections, and a shield supported by said shoulder when said closure is in closed position and encircling said packing on the movement of said closure toward open position, said closure having a member shielding said shoulder in the open position of said closure.

5. A valve comprising a body containing a bore, a closure reciprocable to open and closed positions in said bore and having an expansible packing with a peripheral surface engaging a wall of said bore in the closed position of said closure, a shield movable with said closure and covering said peripheral surface in the open position of said closure, a pressure operable gland for said packing and passing through said shield, and means retarding the movement of said shield after a predetermined movement of said closure toward closed position, said gland having a radially projecting shoulder for engaging and lifting said shield.

6. A valve closure comprising a piston having a head containing a peripheral groove, a packing in said groove, a gland engaging said packing, and a shield movably supported on said gland and having a skirt shielding the periphery of said packing when said shield is supported by said gland, said gland extending upwardly beyond the top of said shield.

7. A valve closure comprising a piston having a head, a packing carried by said head, a gland engaging said packing, means for tightening said gland, and a shield having a flange movable between said gland and means and a skirt shielding said packing when said flange is adjacent to said gland.

8. A valve closure comprising a head and a stem, a packing carried by said head, a sleeve encircling said head and movable axially thereon to cover and uncover the periphery of said packing, a gland engaging said packing and having a shank extending through said sleeve, and a member threaded on said stem for actuating said gland.

9. A valve comprising a body containing transverse and axial bores communicating with one another through a main port and a by-pass connecting said bores, a closure reciprocable to close and open communication through said bores, packing carried by said closure, and a shield into which said packing is movable upon movement of said closure to open position, said shield being subjected to pressure of fluid communicated through said by-pass when said closure is in open position, and to unbalanced pressure in the same direction of fluid communicated through said by-pass and through said main port when said closure is in closed position.

JOSEPH F. SCHILLER.